United States Patent [19]

Tomizawa

[11] Patent Number: 4,638,487
[45] Date of Patent: Jan. 20, 1987

[54] SHROUD FOR ARC FURNACE

[75] Inventor: Fumio Tomizawa, Yokohama, Japan

[73] Assignee: Ishikawajima-Harima Jukogyo Kabushiki Kaisha, Tokyo, Japan

[21] Appl. No.: 696,087

[22] Filed: Jan. 29, 1985

[30] Foreign Application Priority Data

Aug. 30, 1984 [JP] Japan .............................. 59-131849[U]

[51] Int. Cl.⁴ .............................................. F27D 23/00
[52] U.S. Cl. ...................................... 373/9; 95/115.1; 266/158
[58] Field of Search ................. 373/8, 9, 81; 266/143, 266/157, 158, 142, 144, 100, 159; 98/115 R, 115 VM, 115 LM

[56] References Cited

U.S. PATENT DOCUMENTS

| | | |
|---|---|---|
| 3,149,191 | 9/1964 | McFeaters et al. . |
| 3,760,446 | 9/1973 | Payton .................................. 373/9 |
| 3,772,448 | 11/1973 | Bowermaster et al. . |
| 3,913,888 | 10/1975 | Wolters . |
| 3,938,788 | 2/1976 | Josten . |
| 4,088,824 | 5/1978 | Bouistalli .............................. 373/9 |
| 4,089,640 | 5/1978 | Overmyer et al. . |
| 4,160,117 | 7/1979 | Schempp . |
| 4,395,023 | 7/1983 | Tomizawa et al. ...................... 373/8 |

Primary Examiner—Roy N. Envall, Jr.

[57] ABSTRACT

A suction duct having two opposed suction ports is disposed at the top wall of a shroud for a steel making arc furnace such that the two suction ports are in opposed relationship with respect to each other across an opening formed through the top wall of the shroud for permitting the lateral movement of a scrap bucket suspension device. An injection pipe or pipes are horizontally disposed in the suction port such that the injection pipes disposed in one of the suction ports are staggered vertically with respect to those disposed in the other suction port. A fluid is horizontally sprayed from a nozzle or nozzles of the injection pipes across the opening so that vertically spaced fluid shelves are formed across the opening.

3 Claims, 7 Drawing Figures

SHROUD FOR ARC FURNACE

BACKGROUND OF THE INVENTION

The present invention relates to a shroud for a steel making arc furnace and more particularly relates to a shroud which can prevent the diffusion of exhaust gas, dust and the like through a cable hole on the top of the shroud into the atmosphere.

In order to minimize the diffusion and discharge into the surrounding atmosphere of dust, exhaust gas and the like during the operation of an arc furnace, the arc furnaces are in general surrounded by a shroud comprising dust proof side walls and a dust proof top wall.

Referring to FIG. 1, a conventional shroud will be described. A shroud 2 surrounding an arc furnace main body 1 has a dust collector 3 disposed at the undersurface of a top wall 7, an opening in a side wall 4 for lateral movement of a scrap bucket 5 into or out of the shroud 2, doors 6 adapted to close said opening, a further opening 9 on the top wall 7 for passage of a bucket suspending cable 8, a panel 10 for opening or closing the opening 9, and an air curtain device 12 disposed adjacent to the opening 9. When scrap metal 13 is charged into the arc furnace, the air curtain device 12 is driven so that the exhaust gas (indicated by the arrow a) from the arc furnace main body 1 is sucked as indicated by the arrow b and then discharged in the direction as indicated by the arrow c along an inclined flange 14, whereby the exhaust gas flows into a suction port 15 of the dust collector 3.

Referring next to FIGS. 2 and 3, another conventional shroud will be described. The top wall 7 of the shroud 2 is formed with a suction port 16 which is communicated with a dust collector (not shown). Two semi-portal doors 17 for covering a scrap bucket opening are adapted to move sideward along the shroud to the positions indicated by the imaginary lines. A small opening 18 allowing to pass a bucket-suspension cable (not shown) when the doors 17 are closed is formed at the tops of the doors 17. An air curtain device 19 is disposed for discharging air in the direction as indicated by the arrow d so as to seal the opening 18.

In the above-described conventional shroud, the air curtain devices 12 and 19 are of the pusher type so that the openings 9 and 18 are not satisfactorily sealed. Especially in the case of the shroud shown in FIG. 1, the distance between the discharge port of the air curtain device 12 and the suction port 15 of the dust collector 3 is so long that it becomes difficult to process a large quantity of exhaust gas discharged when scrap metal is charged into the furnace. As a result, part of the exhaust gas leaks through the opening 9 into the surrounding atmosphere. Furthermore, the air curtain device 12 is disposed within the shroud 2 so that it is exposed to the high temperature atmosphere containing dust. As a result, there is a defect that a motor and a fan of the air curtain device 12 are damaged. In the case of the shroud of the type described with reference to FIGS. 2 and 3, there is a defect in that the air for forming an air curtain is wasted. Primarily, the air curtain should operate only for several minutes during which the crap metal is charged. But, the air curtain device 19 must be driven constantly so as to seal the opening 18, resulting in increased consumed air volume.

SUMMARY OF THE INVENTION

In view of the above, the present invention has for its object to provide a shroud for an arc furnace which can substantially overcome the above and other problems encountered in the conventional shrouds and which can completely prevent the discharge into the surrounding atmosphere of exhaust gas and the like when scrap metal is charged and during the operation of an arc furnace. According to the present invention, a shroud includes an opening in the top wall of the shroud, said opening being of a minimum width enough for a bucket suspension device to move transversely to the center of an arc furnace main body, a suction duct disposed at the top wall of the shroud so as to cover said opening and having two suction ports opposed to each other across said opening, at least one injection pipe disposed horizontally in each of said suction ports such that the injection pipe disposed in one of said suction ports is staggered vertically with respect to that disposed in the other suction port, said injection pipe having at least one nozzle for spraying a fluid horizontally, and a top door for selectively opening and closing an opening which is formed at the top of said suction duct and through which said bucket suspension device moves laterally.

Fluid jets from the injection pipes form a plurality of fluid shelves which are staggered with respect to each other and laterally extend across the opening and these fluid shelves have a labyrinth effect so that when the exhaust gas passes through the fluid shelves, its pressure is gradually decreased. The exhaust gas then is sucked into the suction duct so that the leakage of the exhaust gas can be prevented.

DESCRIPTION OF THE PREFERRED EMBODIMENT

Figure 1:
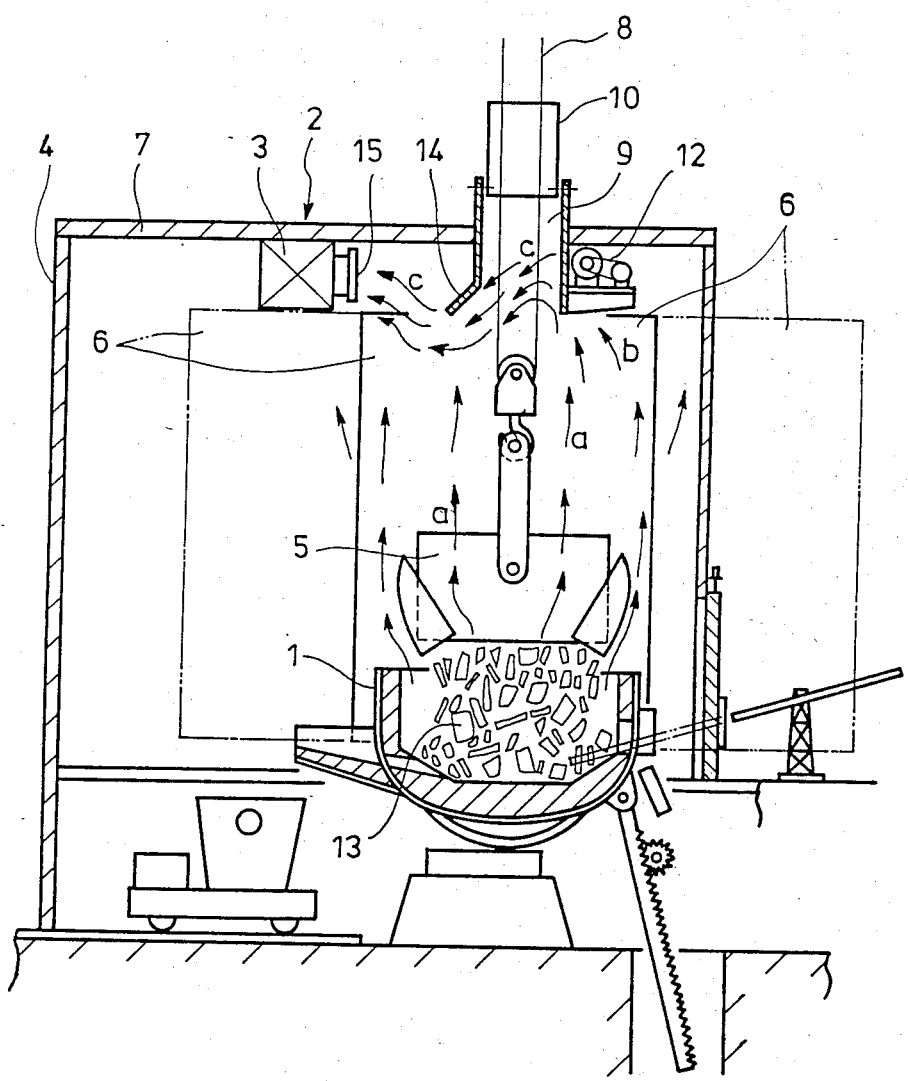
FIG. 1 is a vertical sectional view of a conventional shroud for an arc furnace.
Figure 2:
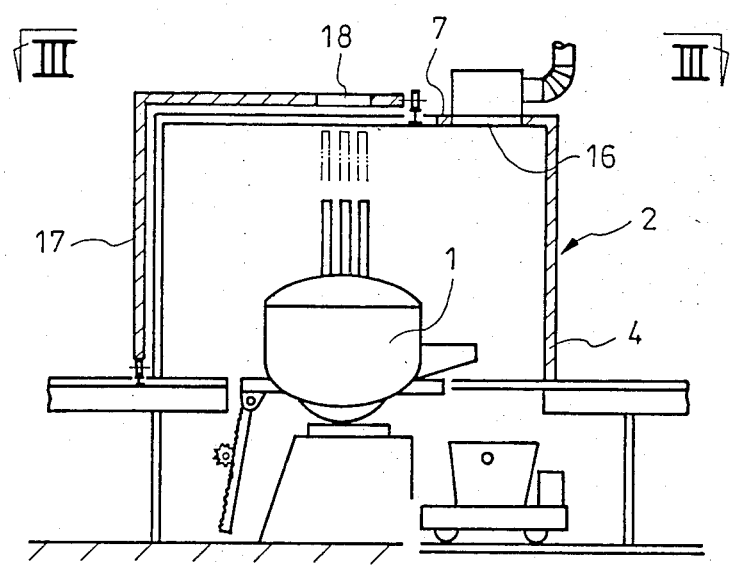
FIG. 2 is a vertical sectional view of another conventional shroud.
Figure 3:
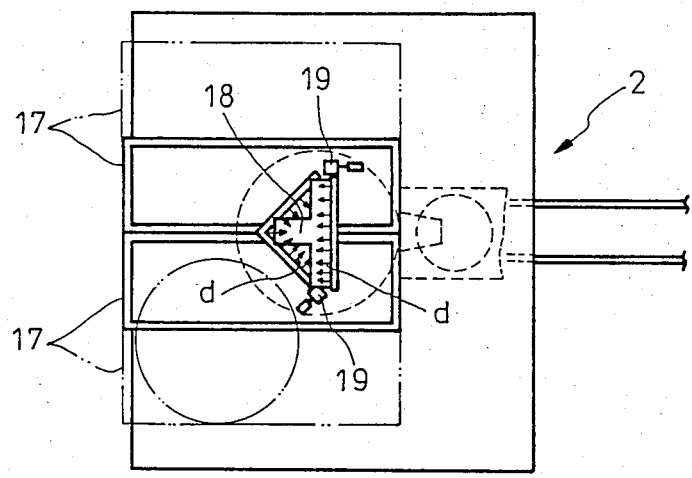
FIG. 3 is a sectional view taken along the line III—III of FIG. 2.

A preferred embodiment of the present invention will be described with reference to the accompanying drawings. FIGS. 4 through 7 show a preferred embodiment of the present invention. An arc furnace main body 21 is surrounded by a shroud 24 comprising dust proof side walls 22 and a dust proof top wall 23. The side wall 22 is formed with an opening 28 for passage of a scrap bucket 27 suspended by a rope 26 when scrap metal is charged. The opening 28 is provided with doors 29 which may be hinged to the side wall 22 or may be of the sliding type. The top wall 23 is formed with an elongated opening 30 so as to permit the lateral movement of the rope 26 to the center of an arc furnace main body 21 when scrap metal is charged. The width e of the elongated opening 30 is of a minimum size, enough to permit the lateral movement of the rope 26 so as to minimize the leakage of the exhaust gas discharged when scrap metal is charged.

A dust-collection suction duct 32 having a rectangular cross sectional configuration is disposed at the top wall 23 so as to cover the opening 30 and communicates with a dust collector (not shown). As in the case of the top wall, the suction duct 32 is formed with an opening 33 the width of which is minimal, enough to permit the lateral movement of the rope 26. This opening 33 is selectively opened and closed by a top door 35 which rides on rails 34 on the top of the suction duct 32. The top door 35 has space adjusting plates 31 which are extended downwardly and are adapted to surround the opening 30 when the top door 35 closes the opening 33. In this case, the lower ends of the space adjusting plates 31 touch, or are slightly spaced apart from, the top of the suction duct 32 by a very small distance.

Figure 5:
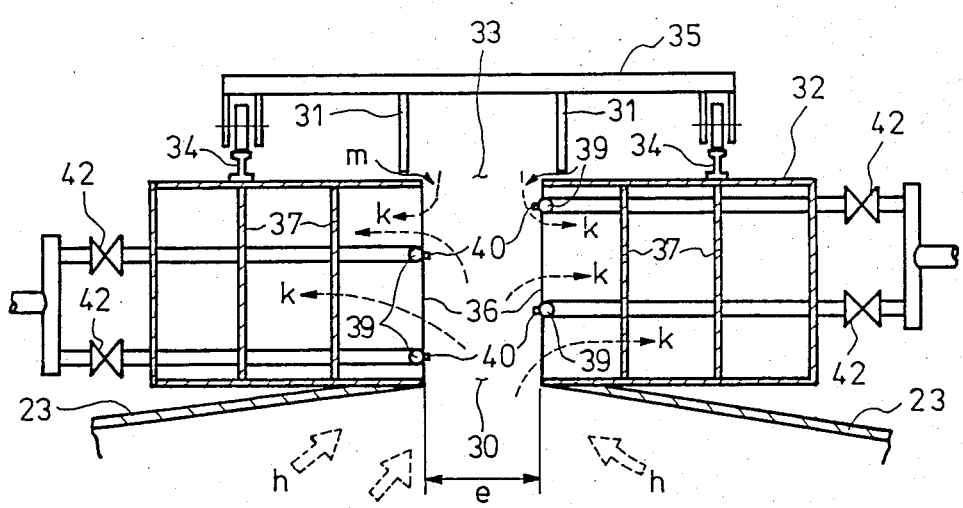
Figure 6:
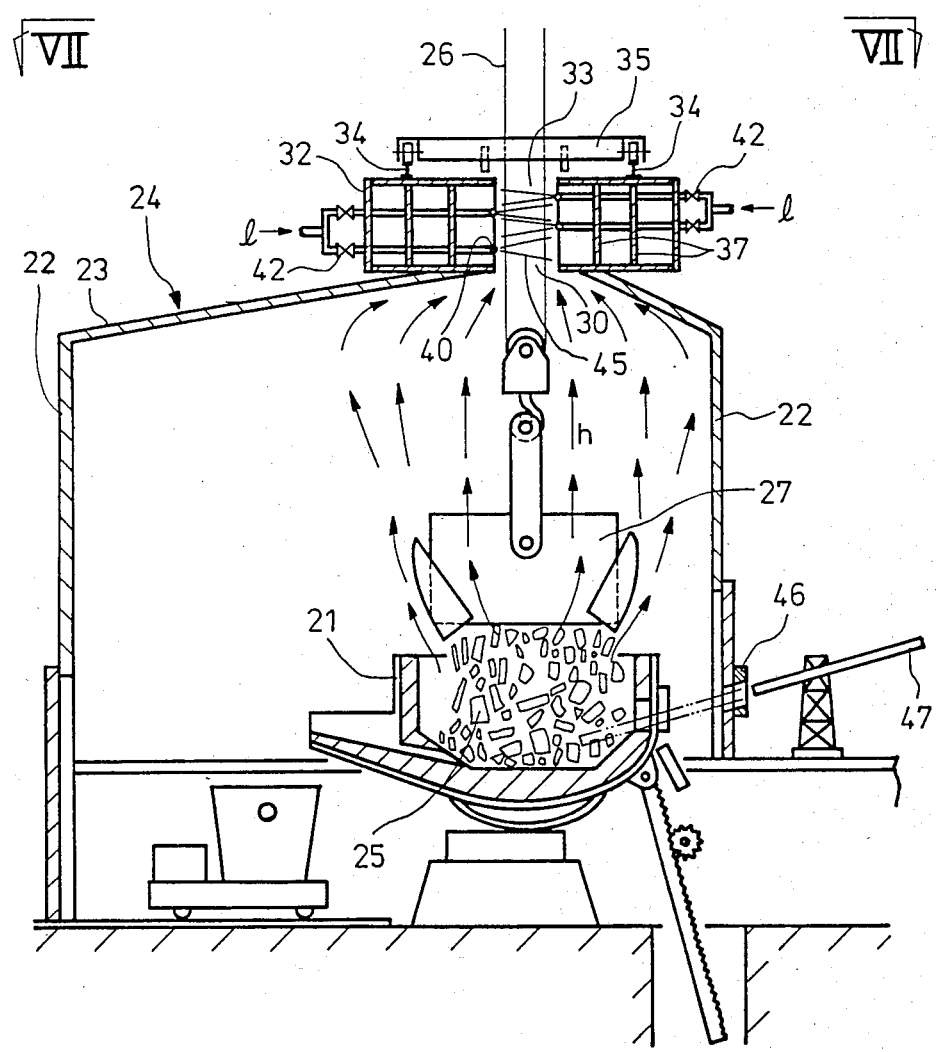
FIG. 6 is a vertical sectional view of a shroud.
Figure 7:
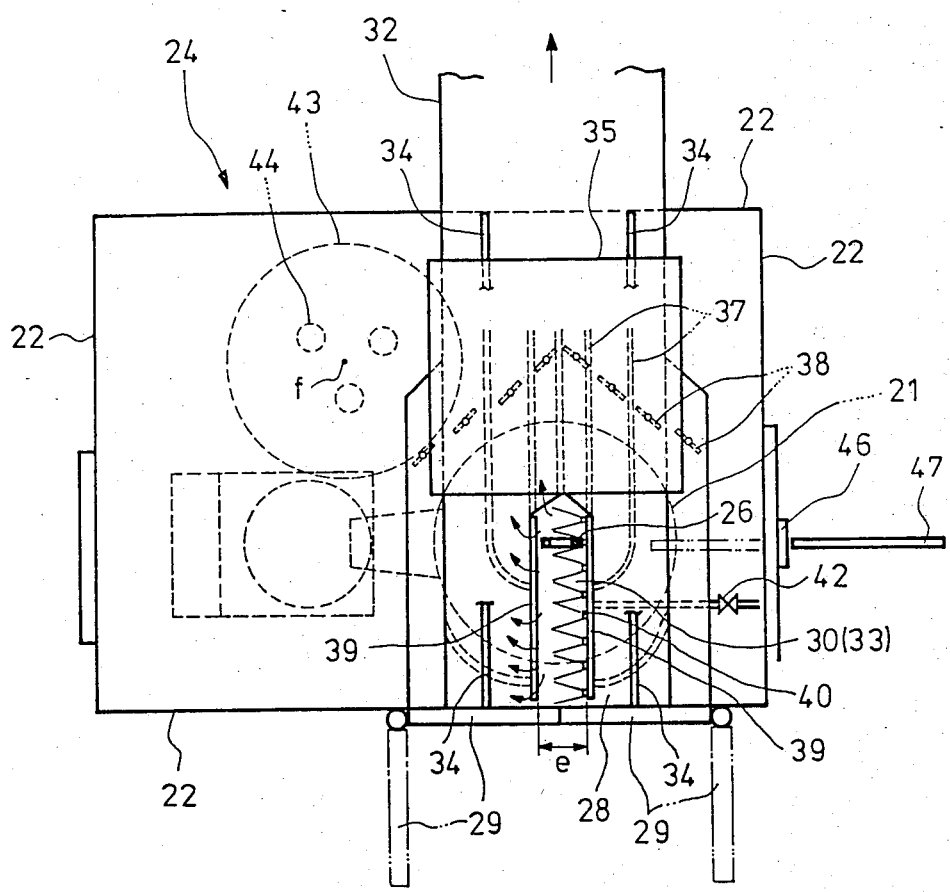
FIG. 7 is a sectional view taken along the line VII—VII of FIG. 6.

As best shown in FIG. 5, suction ports 36 of the suction duct 32 are in horizontally opposed relationship with each other. Each suction port 36 is divided by a guide plate or plates 37 into a plurality of passages so that the suction port 36 can uniformly suck the exhaust gas (See FIG. 7). A flow-rate adjusting damper 38 is disposed in each passage so that the pattern of exhaust gas flow within the shroud 24 may be adjusted.

In each suction port 36, injection pipes 39 extend horizontally and the injection pipes 39 in one of the suction ports 36 are staggered with respect to those in the other suction port 36. Each injection pipe has a nozzle or nozzles 40 (See FIG. 7) which are spaced apart from each other by a suitable distance and which are adapted to spray fluid jets across the opening for the rope. Air is supplied to each injection pipe 39 through a flow-rate control valve 42 as indicated by the arrow l (See FIG. 6).

Next the mode of operation of the shroud will be described in the case of charging scrap metal and in the case of operation of the arc furnace. During charging, a furnace top 43 of the arc furnace main body 21 and electrodes 44 are displaced to the positions indicated by f in FIG. 7. Thereafter, the top door 35 and the doors 29 are opened and then the scrap bucket 27 suspended by the rope 26 is laterally displaced through the side wall 22 to the position immediately above the arc furnace main body 21. Then the doors 29 are closed and the valves 42 are opened so that air is sprayed from all nozzles 40 as indicated by the arrows g in FIG. 4. In this case, the valves 40 are suitably adjusted so that the air jets form a sort of air shelves 45 (See FIG. 4). Next scrap metal is charged into the furnace. In order to form an optimum air shelf 45, the pressure of air sprayed from the nozzles 40 is previously measured in experiments and the valves 42 are adjusted during operation based on such previously measured air pressure.

Figure 4:
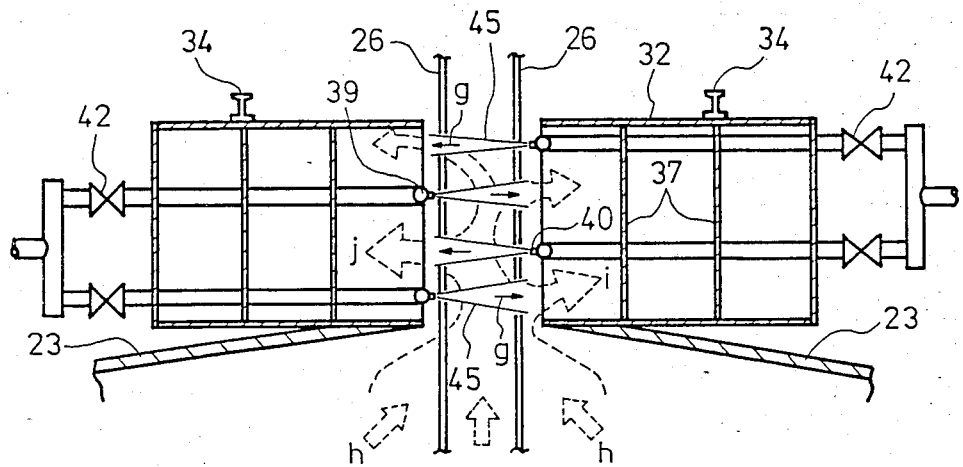
FIGS. 4 and 5 are views used to explain the mode of operation in the vicinity of the suction duct when scrap metal is charged and during the operation of an arc furnace, respectively.

Exhaust gas discharged when scrap metal is charged rises upwardly as indicated by the arrows h in FIG. 4 and contacts first the lowermost air shelf 45. Then part of the exhaust gas is guided to the right in FIG. 4 as indicated by the arrow i and sucked into the suction duct 32. The remaining exhaust gas which has passed through the lowermost air shelf 45 contacts the next lowermost air shelf 45 and is guided to the left in FIG. 4 and sucked into the suction duct 32 as indicated by the arrow j. When the exhaust gas rises and passes through the air shelves 45 in this way, its quantity is gradually decreased and its pressure is gradually dropped owing to the labyrinth effect of the air shelves. Therefore, when the exhaust gas reaches the uppermost air shelf 45, it cannot pass through this air shelf. Thus all of the exhaust gas is sucked into the suction duct 32.

Next the mode of operation of the shroud during the operation of the arc furnace will be described. After scrap metal has been charged into the furnace, the scrap bucket 27 is moved out of the shroud 24 and the furnace top 43 and the electrodes 44 are returned to their initial positions. The doors 29 and the top door 35 are closed so that the openings 30 and 33 are closed. Thereafter the valves 42 are closed so that no air is sprayed through the nozzles 40. Now the arc furnace main body 21 is ready to be powered on. Oxygen is injected into the furnace through an oxygen lance 47 extending into the furnace through a small opening 46 of the side wall 22 so that a large quantity of exhaust gas is produced. The exhaust gas is drafted and reaches the top wall 23 of the shroud 24 as indicated by the arrows h in FIG. 6. Then the exhaust gas is sucked through the opening 30 into the suction duct 32 as indicated by the arrows k in FIG. 5. In this case, as the width e of the opening 30 is selected to be a minimum as described above, a large quantity of exhaust gas stays temporarily at the underside of the top wall 23 of the shroud 24 and is gradually sucked through the opening 30 into the suction duct 32. In this case, the opening 33 of the suction duct 32 is closed by the top door 35 and the spaces between the lower ends of the space adjusting plates 31 of the top door 35 and the top surface of the suction duct 32 are sealed by the air flowing from the exterior of the shroud 24 into the suction duct 32 as indicated by arrows m in FIG. 5. Therefore the leakage of the exhaust gas to the exterior of the shroud 24 can be prevented.

It is to be understood that the present invention is not limited to the above-described embodiment and that various modifications may be made without departing from the true spirit of the present invention. For instance, the present invention may be applied to an arc furnace with a shroud of the type in which a scrap bucket is lowered through an opening formed through a top wall of the shroud and then laterally moved toward the center of the arc furnace. The suction duct may be disposed externally on the top wall as shown; alternatively, it may be disposed therein or internally thereon. The top door may ride on rails on the top wall of the shroud to wholly surround the suction duct; in such a case, the space adjusting plates slightly touch or are spaced apart from the top wall by a very small distance.

The effects, features and advantages of the present invention may be summarized as follows:

(i) When scrap metal is charged, fluid such as air is sprayed from nozzles of injection pipes which are vertically staggered from each other across a cable opening so that a plurality of air shelves are formed in the cable opening. Therefore, exhaust gas, which passes through these air shelves, gradually decreases its pressure due to the labyrinth effect of the air shelves and is sucked into the suction duct. As a consequence, the discharge of the exhaust gas into the surrounding atmosphere can be completely prevented.

(ii) During the operation of the arc furnace, the top door closes the cable opening and the exhaust gas in the shroud is gradually sucked into the suction duct through the cable opening with a minimum size. Therefore, even when exhaust gas is produced in large quantity during oxygen refining, the leakage of exhaust gas to the surrounding atmosphere can be prevented.

What is claimed is:

1. A shroud for a steel making arc furnace having dust-proof side walls and a duct-proof top wall, said walls surrounding an arc furnace main body, and also having doors for movement of a suspended scrap bucket into and out of said shroud, said top wall having an opening of a minimum width, sufficiently wide for a bucket suspension device to move transversely to a center of said arc furnace main body, a suction duct disposed at said top wall at said opening, said suction duct having a top, passage at said top of said suction duct and through which said bucket suspension device is movable laterally, and a plurality of suction ports opposed to each other horizontally across said opening, a plurality of injection pipes in said suction ports disposed such that injection pipes in one of the suction ports are staggered vertically in zig-zag manner with respect to injection pipes in the other suction port, said injection pipes having a plurality of nozzles for spraying fluid horizontally toward an opposed suction port, and a top door for selectively opening and closing said passage.

2. A suction duct according to claim 1, comprising flow-rate control valve means for said injection pipes.

3. A suction duct according to claim 1, wherein the fluid sprayed from the injection pipes is air.

* * * * *